June 24, 1969 G. W. DICK 3,452,335
SYMMETRICAL ALL-MAGNETIC SHIFT REGISTERS
Filed July 21, 1965 Sheet 6 of 9

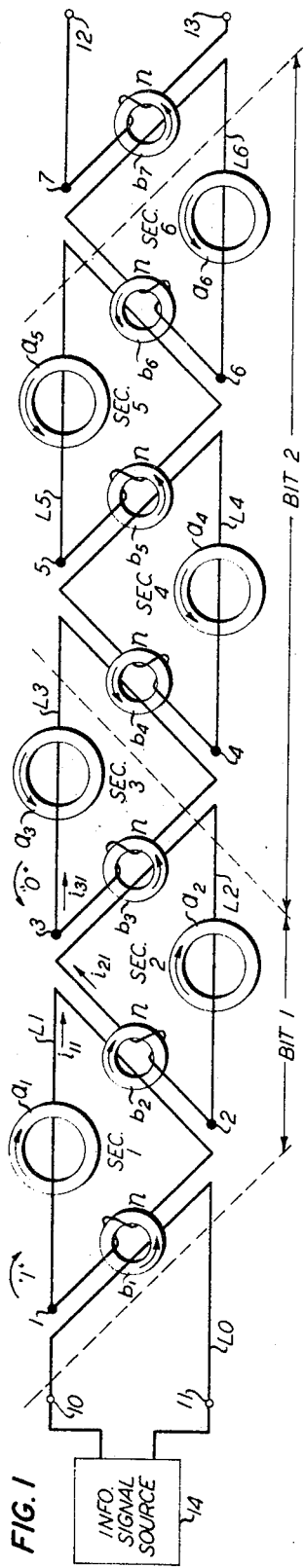

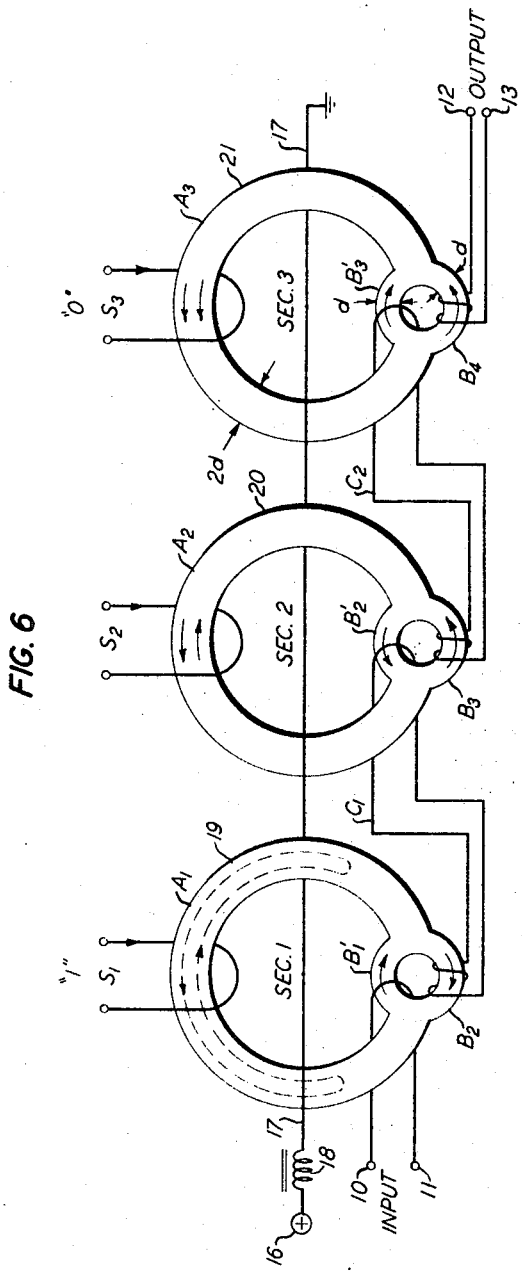

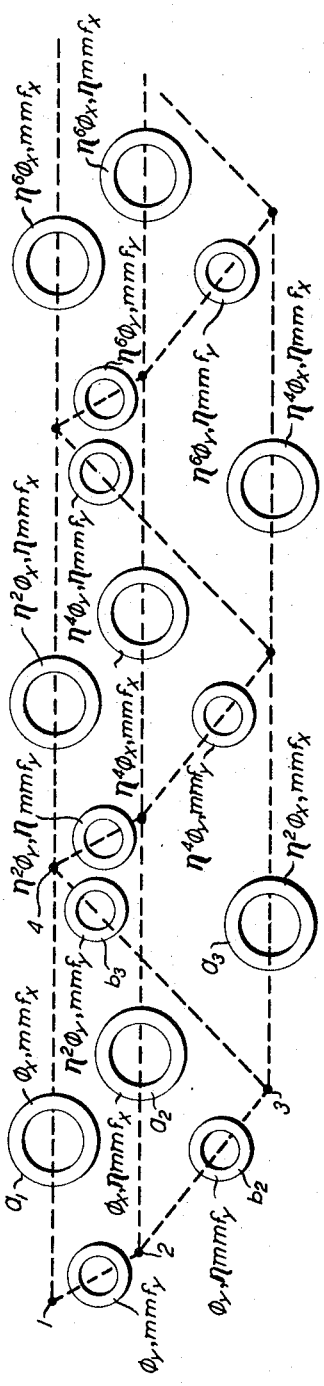

United States Patent Office

3,452,335
Patented June 24, 1969

3,452,335
**SYMMETRICAL ALL-MAGNETIC
SHIFT REGISTERS**
George W. Dick, Morris Township, Morris County, N.J.,
assignor to Bell Telephone Laboratories, Incorporated,
New York, N.Y., a corporation of New York
Continuation-in-part of application Ser. No. 199,371,
June 1, 1962. This application July 21, 1965, Ser.
No. 473,760
Int. Cl. G11b 5/00
U.S. Cl. 340—174            30 Claims

ABSTRACT OF THE DISCLOSURE

A family of all-magnetic shift registers is shown, including both toroidal core and multiapertured core embodiments. The lowest phase order embodiment is a three-phase shift register wherein three toroidal magnetic cores are utilized for storing information in each bit position, and all-magnetic coupling arrangements are provided among those cores and between stages of the register. Design rules for extending the underlying shift register operating principle to systems of higher phase orders are presented and are applied in connection with a four-phase shift register. The rule of operation of these registers is that in an $m$ phase circuit, including storage elements arranged in a predetermined sequence, the shifting of one storage element from a first to a second bistable condition causes the $(m-1)^{th}$ element following the shifting element in the sequence to be shifted into its first condition if it was not already in that condition. This type of operation takes place without disturbing intermediate storage elements.

---

This is a continuation-in-part of my prior copending application Ser. No. 199,371 which was filed June 1, 1962, and has been abandoned. The invention relates to controlled all-magnetic logic networks, and it has particular reference to such logic networks which may be employed in all-magnetic shift registers.

The use of magnetic devices in many logic circuit applications is becoming increasingly popular. One widespread application for magnetic circuit devices is in the shift register field, and in that field an increasing amount of effort is being directed toward improvements in shift registers utilizing only magnetic elements and interconnecting electric circuit leads. No conventional current-carrying circuit elements are included in such a shift register, which is commonly designated an "all-magnetic shift register."

It has heretofore been the practice to arrange the basic logic blocks comprising a shift register stage so that a minimum of four phases of shift register operation were required in all-magnetic shift registers in order to move information bits through a stage of the register with appropriate buffering to prevent intersymbol interference. In some prior art circuits the four phases of shift register operation are controlled by four phases of externally applied control signals. In other circuits, however, only a part of the phases of operation are controlled by externally applied control signals, and the remaining phases of operation are controlled by the nature of operation of certain shift register circuit magnetic elements. In all cases, however, the known prior art circuits require a minimum of four time phases to cycle a register stage completely, and this requirement imposes a restriction upon the maximum speed of operation.

It is, therefore, one object of the invention to improve all-magnetic logic networks.

An additional object is to increase the potential operating speed of all-magnetic shift registers.

It is another object to operate an all-magnetic shift register stage with less than four time phases for a cycle of operation.

An additional object is to improve operating margins for all-magnetic logic networks.

These and other objects of the invention are realized in an illustrative embodiment wherein plural magnetic devices are coupled together to form a three-phase logical network with at least two input circuits and an output circuit. This network is responsive to first and second successive input signals of different predetermined polarities on one input circuit, followed by a third signal of a predetermined polarity on the other input circuit, for producing in the output circuit in coincidence with the second and third signals two successive signals of the aforementioned different predetermined polarities. Within the network are a two-state magnetic storage device, with set and reset states, and electromagnetic coupling means with two-state input and output portions. The two portions are operatively coupled together and operatively coupled to the storage device in opposite senses so that the setting of the input portion also sets the storage device and the resetting of the input portion also sets the output portion. The aforementioned one input circuit of the network is coupled to the coupling means input portion, and the other input circuit is coupled to the storage device and the coupling means output portion.

A plurality of the described logical networks are connected in a tandem sequence of a three-phase shift register. Shift signals are successively applied to the devices in the sequence of the tandem connection to switch the storage devices of the sections to their reset conditions. The resetting of each storage device causes the coupling means to set the storage device in the second following section of such tandem sequence without altering the stable condition of the storage device in the intermediate section.

It is one feature of the invention that the network coupling means associated with each pair of networks is arranged so that the application of a shift signal to reset the storage device of a first one of such networks in the sequence enables the output portion of the coupling means to participate in the propagation of resulting signals through the shift register but simultaneously disables such portion for propagating to other networks any signals appearing in the coupling means of either network of the pair which tend to set the storage device of such network.

It is another feature of the invention that as few as three time phases are advantageously utilized for driving a shift register stage through a complete cycle of operation with appropriate buffering between information bits to prevent intersymbol interference.

A further feature is that the three-phase logical network of the invention is the lowest ordered one of a family of readily derivable logical networks of higher numbers of phases and which display improving operating margins with increasing phase order of the register.

A full understanding of the invention and the various objects and features thereof may be obtained from the following description and the appended claims when considered in connection with the attached drawings wherein:

FIG. 1 is a partial schematic diagram of a shift register in accordance with the invention;

FIG. 2 is a schematic diagram, using mirror symbology, of the shift register of FIG. 1;

Figure 5:
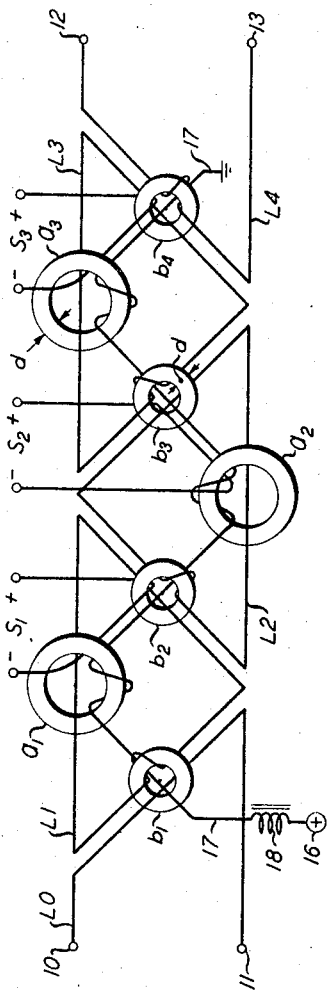
Figure 4A:
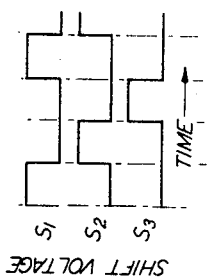
Figure 7A:
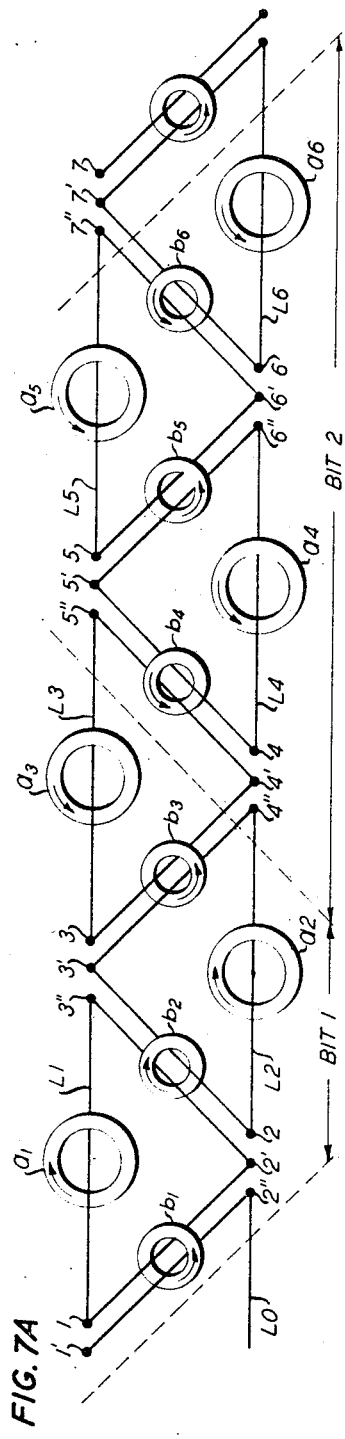
Figure 8A:
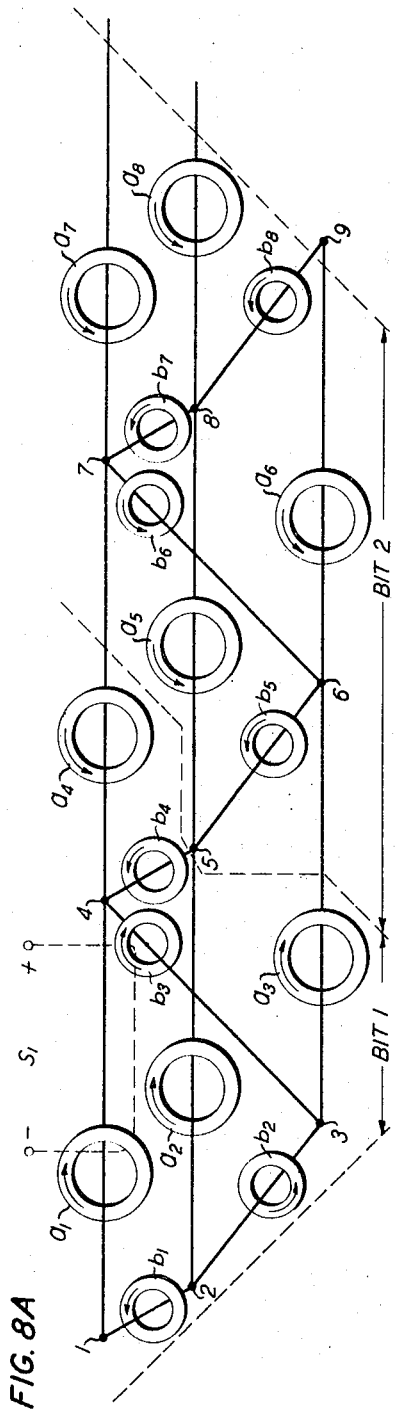
Figure 9B:
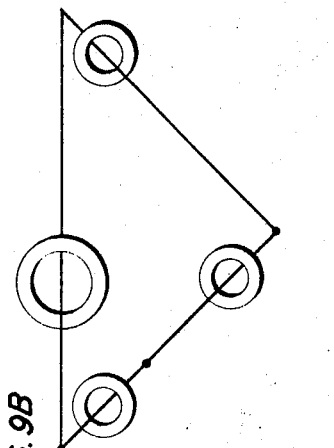
Figure 9A:
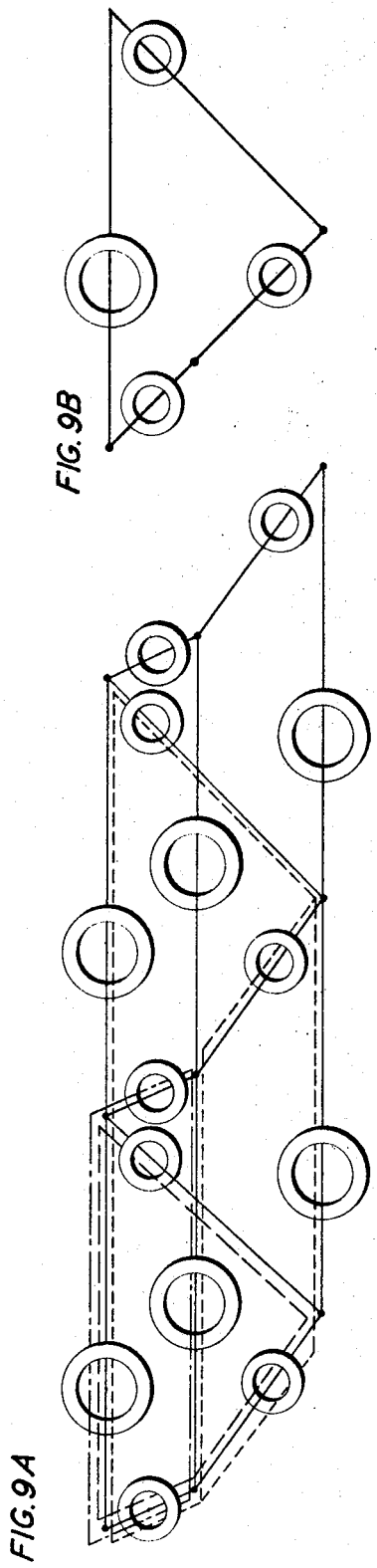
Figure 9C:
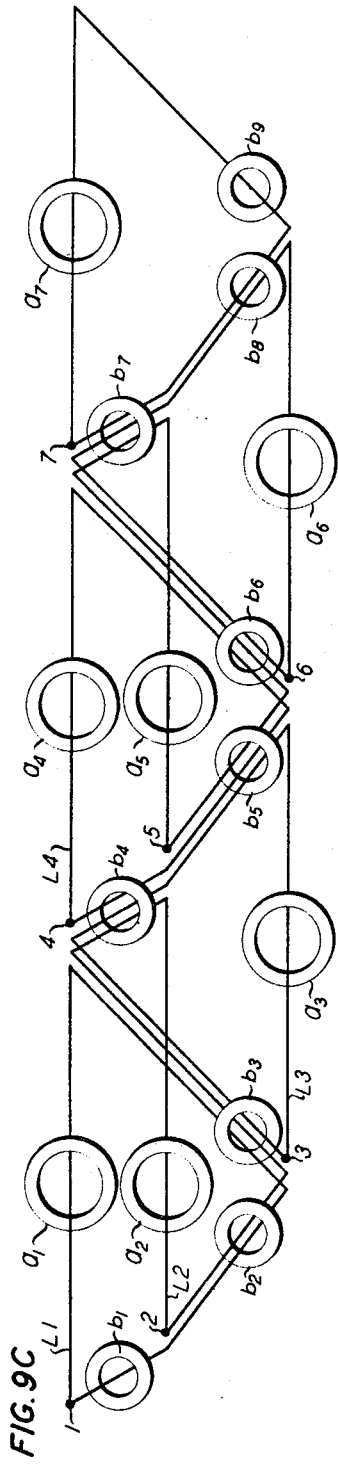
Figure 10:
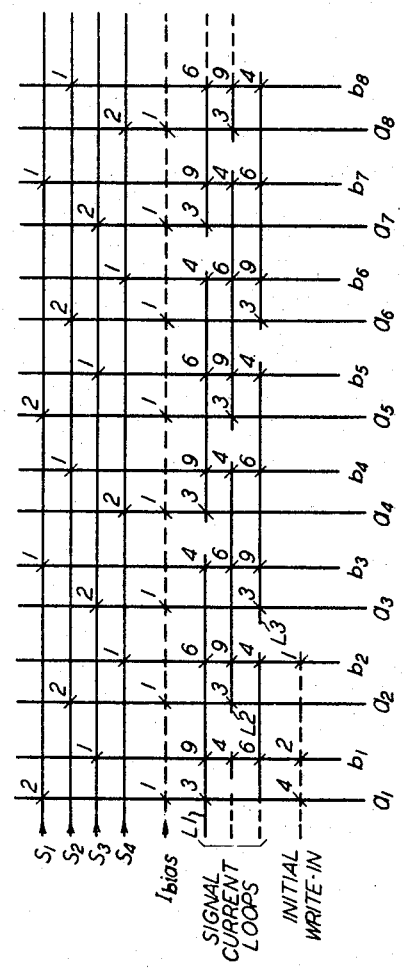

FIGS. 4A and B are timing diagrams of shift and bias signals for operating the circuit of FIG. 2;

FIG. 5 is a more complete schematic diagram of one stage in the shift register of FIG. 1;

FIG. 6 is another embodiment of the invention utilizing multiaperture magnetic devices;

FIGS. 7A, B, and C illustrate the derivation of certain basic concepts of the family of circuits of the invention;

FIGS. 8A and B, and 9A, B, and C illustrate the development of higher order embodiments of the family of circuits;

FIG. 10 is a mirror image diagram of a specific shift register of the type indicated in FIG. 9C;

FIG. 11 is a partial mirror diagram illustrating an aspect of the operation of the circuit of FIG. 10; and FIGS. 12A, B, and C illustrate the development of a modified form of the circuit of FIG. 9C.

*Three-phase network with toroidal cores*

The schematic diagram of FIG. 1 illustrates two complete stages of the information transfer circuits for an all-magnetic shift register embodying the invention. Each stage includes six toroidal magnetic cores having a rectangular hysteresis characteristics defining two stable conditions of magnetic remanence. Information storing cores are designated $a$ and coupling cores are designated $b$. Subscripts on the letter designations indicate the position of the core in the tandem sequence of shift register sections.

Each shift register section includes a storage core $a$ and electromagnetic coupling means comprising input and output coupling cores $b$ which are linked together and to the storage core by a loop circuit L. Each of the cores $b$ is common to two circuits and has a primary and a secondary portion to which such circuits are coupled, respectively. A full stage of the shift register illustrated includes three sections of the type just described, but for convenience in describing operation of the register the stages are divided as indicated in FIG. 1 at an intermediate circuit plane in every third section. Input information signals from a source 14 are applied at terminals 10 and 11 and output is taken at terminals 12 and 13.

Within each section the circuit loop L links the storing cores and the coupling cores in opposite senses so that a loop current which tends to drive a storing core to one of its stable magnetic conditions also tends to drive the coupling cores to the other stable magnetic condition. In addition, the loop circuits of successive shift register sections link their respective storing cores $a$ in alternate opposite directions so that clockwise currents in all of the loop circuits tend to establish clockwise magnetization in storing cores of odd numbered shift register sections and counterclockwise magnetization in storing cores of even numbered sections.

Each coupling core engaging two successive loop circuits in the shift register is provided with secondary winding turns in larger number than turns in the primary winding thereof in order to generate gain needed for overcoming circuit losses. This gain arrangement is convenient when toroidal cores are employed, but other convenient arrangements for overcoming circuit losses could also be employed.

Cores $a$ and $b$ in FIG. 1 advantageously have approximately the same magnetic path cross-sectional area, but the cores $a$ have a much longer magnetic path length than do cores $b$ so that the cores $a$ require a larger magnetomotive force when both $a$ and $b$ cores are made of the same material. Thus, the $a$ cores require a much larger net current for switching between stable conditions than do the $b$ cores. As will be described subsequently in greater detail, the cores switch in storing-coupling core pairs when information is being shifted through the register. Since the larger storage core and the smaller coupling core of a switching pair are coupled together by an essentially resistanceless loop circuit, they switch at the same rate and develop substantially equal induced potentials in the circuits coupled thereto. However, drive windings are placed on $a$ and $b$ cores with drive turns proportioned to provide larger magnetomotive forces to the larger cores, as will be hereinafter described, to generate a net loop current of predictable direction. Devices with different path lengths are utilized in order to have optimum speed and safety margins as is well known in the art. In FIG. 1 the storing cores $a$ have longer path lengths than do the coupling cores $b$ but the same effect could be produced by other means such as by using core materials with different coercive requirements.

In the circuit of FIG. 1, a practical difference in coercive force for the cores of a storing-coupling core pair is for the storing core force to be three to five times as large as the coupling core force. However, much larger difference factors could be used before any significant difficulty is encountered as a result of spurious signals generated in shuttled cores that have imperfect rectangularity in their hysteresis characteristics.

The shift register shown in FIG. 1 is described herein in connection with a system of binary representation wherein a bit of binary coded information may be either a ONE or a ZERO. Accordingly, in FIG. 1 it is assumed that cores magnetized in the clockwise direction are set to represent the binary ONE condition while cores magnetized in the counterclockwise direction are reset and represent the binary ZERO condition. The first one-bit stage in FIG. 1 includes a ONE as indicated by the clockwise magnetization arrows on cores $a_1$, $b_2$, and $a_2$. All other cores are magnetized in the counterclockwise direction.

In FIG. 2 the conventional mirror symbology is employed to depict the information transfer circuits of FIG. 1 as well as shift signal circuits and bias circuits that can be employed with the shift register. The details of a stage of the shift register with all of the aforementioned circuits being shown, and including winding directions, may be found in FIG. 5. In FIG. 2 the heavy vertical lines represent the magnetic cores of FIG. 1 and bear the same reference characters. The lighter lines crossing these cores represent circuit leads electromagnetically engaging the cores where short diagonal lines at intersections of lead lines and core lines are provided to indicate lead winding polarity on the core. Given a direction of electric current flow in a lead, the direction of flux generated in an associated magnetic core is indicated by the direction in which the current direction arrow would be reflected along the core if the short diagonal line at the intersection is considered to be a mirror. The direction of current induced in a lead by a changing magnetic flux in the core during a flux reversal is indicated by following the new flux direction arrow to the end of the core and returning back along the core in the reverse direction. Now, the direction in which the reversed flux arrow is reflected along the lead in question by the short diagonal line which is considered to be a mirror yields the direction of the induced current in the lead.

In FIG. 2 a multiphase shift signal control source 15 supplies signals, of the type illustrated in FIG. 4A, to shift circuits S1, S2, and S3. Source 15 may include any suitable structure such as, for example, an oscillator driving a ring counter having different outputs connected to the mentioned shift circuits. Circuits S1, S2, and S3 couple the shift signals with any required wave shaping and impedance transformation to shift register cores and are considered to include circuit leads linking such cores as illustrated. Details of source 15 and circuits S1, S2, and S3 are not shown because such details do not comprise a part of the invention.

Shift circuit S1 supplies shift current pulses from source 15 to cores $a_1$ and $b_2$ with a polarity and sufficient magnitude to reset the cores and generate downward flux in the core representations of FIG. 2. This downward flux represents the ZERO binary condition and corresponds to the counterclockwise flux direction in the cores of FIG. 1. Conversely, an upward flux in the core representation of FIG. 2 represents a binary ONE.

In a similar manner shift circuit S2 supplies shift signals to cores $a_2$ and $b_3$ with a direction and magnitude to reset those cores, and shift circuit S3 supplies resetting shift pulses to cores $a_3$ and $b_4$. Sections 4, 5, and 6 of the shift register also receive shift pulses from additional circuits S1 through S3, respectively, in the manner just described with respect to sections 1, 2, and 3. If additional shift register stages are provided they would also be supplied with shift signals from further circuits S1 through S3 in like manner, because the shift register is characterized by phase symmetry. That is, the circuitry of each phase position is the same as every other one. In the illustrated three-phase arrangement the circuitry includes a plurality of circuit nodes numbered in the sequence in which an information front moves through the storage cores of the register. Connected to each node are two branch circuits to which are coupled a correspondingly subscripted storage core and coupling core, respectively. Such branch circuits are included in series in the correspondingly subscripted loop circuit of the mentioned node. A node and the correspondingly designated storage and coupling cores comprise a phase position in multiphase circuits of the type considered herein regardless of the number of phases. FIG. 4A illustrates a typical timing diagram of the shift pulses provided in a three-phase circuit with each pulse occupying one-third of the time slot for a cycle of operation.

Loop circuits for the sections of the shift register are indicated in FIG. 2 by horizontal lines L1 through L6. Those horizontal lines represent schematically the correspondingly designated closed loop circuits of FIG. 1. The appearance of double diagonal lines at the intersections of the $b$ cores with certain of the loop circuit representations indicate a larger number of circuit turns on those cores, than are provided on cores with only single diagonal lines.

Also shown in FIG. 2 are pulse bias circuits B1, B2, and B3 for supplying bias pulses tending to set the two storing cores, and their intermediate coupling core, which follow in the tandem shift register sequence a storing-and-coupling core pair which are at the same time receiving a shift pulse. A multiphase bias signal control source 15', similar to source 15, supplies signals to circuits B1, B2, and B3, which in turn are similar to shift circuits S1, S2, and S3. In some applications sources 15 and 15' may be a single source.

Figure 4B:
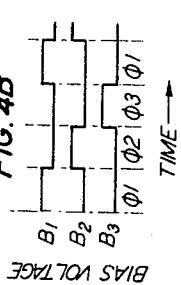

The pulse bias circuits couple to their respective cores the signals shown in FIG. 4B. The bias signals occur at the same time as the shift signals but are of smaller amplitude because they are not capable of producing a switch action without assistance. The bias facilitates the transfer of information through the register in a manner which will be subsequently described. Also shown in FIG. 2 by a broken lead is a direct-current bias circuit B(D-C) which may be used in place of the pulse bias to bias all of the shift register cores toward the set condition. The alternative direct-current bias simplifies the bias circuitry, but it requires larger shift pulses to control shift register operation. The magnitude of the bias provided either by the pulse bias circuits or by the alternative direct-current bias circuit is such that the cores receiving such bias have generated therein a magnetic field which is somewhat smaller than the coercive field required to switch the device from the ZERO to the ONE condition; and extra bias circuit winding turns are provided on large cores where a single lead links both large and small cores.

Figure 3:
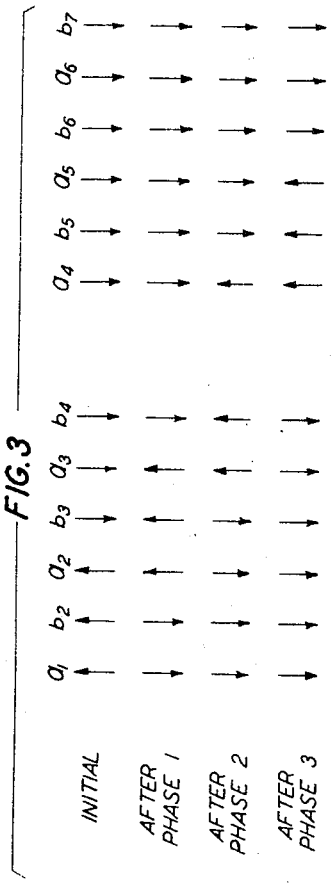
FIG. 3 is a diagram of the binary conditions of magnetic devices in the shift register of FIG. 1 illustrating the operation of the invention.

FIG. 3 is an arrow diagram indicating conditions of the various shift register cores during a complete cycle of three-phase operation for the shift register in FIG. 2. Arrows in FIG. 3 which are directed upward indicate a ONE condition and those which are directed downward indicate a ZERO condition. Arrows included in FIG. 2 adjacent to the core representations indicate an assumed condition wherein a ONE is stored in cores $a_1$, $b_2$, and $a_2$, while all of the remaining illustrated cores are in their ZERO condition. Thus, the arrows of FIG. 2 correspond to the arrows in the top row of FIG. 3 which is designated "Initial" condition.

A shift current pulse applied to circuit S1 in FIG. 2 drives cores $a_1$ and $b_2$ to the ZERO condition, and at the same time pulse bias applied to cores $a_2$, $b_3$, and $a_3$ tends to bias those cores to the ONE condition. The switching of cores $a_1$ and $b_2$ from the ONE to the ZERO condition generates a clockwise current $i_{11}$ in loop L1. This current tends to reset core $b_1$ to the ZERO condition but shuttles that core with no effect since the core is already in the ZERO condition as will be seen from the subsequent description of the shift register operation. Since two cores $a_1$ and $b_2$ are switching in loop L1, and induce oppositely polarized voltages in loop L1, it is not necessary to provide additional impedance in the loop for absorbing the voltage generated by the switching of either of the cores.

The switching of core $b_2$ also produces in loop L2 a clockwise current $i_{21}$, and this current tends to reset core $a_2$ and set core $b_3$. The aforementioned setting bias established by circuit B1 in core $a_2$ holds that core immune to the effects of loop current $i_{21}$. However, core $b_3$ is switched to the ONE condition and generates in loop L3 a further clockwise current $i_{31}$ which sets core $a_3$ and tends to reset core $b_4$. The setting of core $a_3$ is assisted by the previously mentioned bias signal in bias circuit B1, and this core switches to the ONE condition. Core $b_4$ is already in its ZERO condition and is shuttled by loop current $i_{31}$ without producing an effect in subsequent shift register sections. The forward propagation of the shift signal is thus stopped at core $b_4$. It is because of this blocking effect of core $b_4$, and the similar action of core $b_1$, previously mentioned, that the coupling cores are sometimes herein designated "blocking cores."

Upon the completion of the first phase of the shift operation, the binary ONE which previously existed in cores $a_1$, $b_2$, and $a_2$ now resides in cores $a_2$, $b_3$, and $a_3$. The switching of cores $a_1$ and $b_2$ from the ONE to the ZERO condition resulted in the switching in the second succeeding loop of the shift register tandem sequence of the cores $a_3$ and $b_3$ from the ZERO to the ONE condition. All other cores of the shift register remain in their initial conditions. The ONE from cores $a_1$ and $b_2$ was thus leap frogged over core $a_2$ and set into cores $b_3$ and $a_3$. The continuous representation of information by two storage cores and one coupling core is called symmetry of information disposition.

The second phase of the shift operation is initiated by the application of a shift pulse to circuit S2 simultaneously with the application of a bias signal to bias circuit B2. The shift pulse switches cores $a_2$ and $b_3$ from the ONE to the ZERO condition and the resulting induced current causes cores $a_4$ and $b_4$ associated with the second succeeding shift register section to switch from their ZERO to their ONE condition in the same manner previously described for the transfer during shift phase one. This time core $b_2$, which was reset during the first shift phase, is shuttled by the counterclockwise loop current in loop L2 resulting from the switching of cores $a_2$ and $b_3$ to the ZERO condition. Core $b_2$ thus prevents reverse propagation of the signals. Similarly, core $b_5$ is shuttled by the counterclockwise current induced in loop L4 for switching core $a_4$ to the ONE condition and thereby prevents unlimited forward propagation of the signals in the register. Upon completion of the second phase of the shift operation, the binary ONE resides in cores $a_3$, $b_4$, and $a_4$. This time core $a_3$ acted as the anchor core when binary information was leapfrogged from cores $a_2$ and $b_3$ of loop L2 to the cores $b_4$ and $a_4$ of loop L4 in the second succeeding shift register section.

During a third phase of the shift operation, core $a_4$ serves as the anchor storing core, and the binary ONE is leapfrogged from cores $a_3$ and $b_4$ of register section 3 to cores $b_5$ and $a_5$ of register section 5 in the same manner previously described for shift during phases one and two. Upon the completion of phase three, and assuming that no additional information is shifted into the cores of loop circuit L1, all six cores of the first stage in the shift register are in the ZERO condition. Cores $a_4$, $b_5$, and $a_5$ are in the ONE condition in the second stage of the shift register; and cores $b_6$, $a_6$, and $b_7$ are in the ZERO condition.

FIG. 5 shows the manner in which shift and bias connections may be applied to the cores of the first, or bit 1, stage in the shift register of FIG. 1. In this case the coupling lead portions of shift circuits S1 through S3 are shown engaging their respective cores with a winding direction such that the shift signals of the indicated polarity tend to eestablish counterclockwise magnetization in those cores. Direct-current bias, of the type shown by broken lines B(D–C) in FIG. 2, is illustrated in FIG. 5 and includes a battery 16 with one terminal grounded and the other terminal connected through a choke coil 18 to a lead 17 which is laced through all cores of the stage and returns to ground. Coil 18 presents a high impedance in the bias circuit to switching currents induced in lead 17 during core switching. The direction of lacing for lead 17 is such as to establish a bias field in each core in the ONE direction, and the bias field magnitude is somewhat smaller than the coercive field required for switching. In this connection the lead 17 is provided with a larger number of turns on the $a$ cores than it has on the $b$ cores in order that the single current level in lead 17 may bias all of the cores near their coercive switching levels even though the cores have different magnetic path lengths.

It may be noted here that input signals to the information circuit of FIG. 1 can be applied conveniently at terminals 10 and 11 during shift phases two and three. During shift phase two a potential difference is applied at terminals 10 and 11 to drive a clockwise current through loop L0 for driving core $b_1$ to the ONE condition and at the same time inducing in loop L1 a clockwise current which also sets core $a_1$ in the ONE condition. During phase three the potential at input terminals 10 and 11 drives a counterclockwise current through loop L0 thereby resetting core $b_1$ and driving cores $b_2$ and $a_2$ into the ONE condition. Alternatively write-in can be accomplished by a winding linking cores $a_1$, $b_2$, and $a_2$ for switching all three simultaneously to the ONE state during phase three.

The write-in operations just described do not conflict with the normal shift operations previously described because of the aforementioned buffering action of coupling cores. For example, during shift phase one core $b_2$ was reset and is shuttled by currents in loop L2 during the second shift phase as has been previously described. However, during the shift phase two in the two-phase write-in operation, when cores $b_1$ and $a_1$ are being set, the clockwise current in loop L1 also shuttles core $b_2$ so that the effects of the write-in operation and the effects of the shifting operation in phase two cannot interfere with one another. In a similar manner core $b_3$ acts as a buffer during shift phase three when the write-in is being completed by the setting of cores $b_2$ and $a_2$.

*Three-phase network with multiaperture devices*

In FIG. 6 the three-phase shift register concept is applied to multiaperture magnetic devices. In this case two-aperture devices are employed, and three such devices 19, 20, and 21 are utilized to form a complete stage of a three-phase all-magnetic shift register corresponding to that of FIG. 5. Each device includes magnetic circuit branches corresponding to the cores of the shift register stage in FIG. 5, and corresponding reference characters are employed. Thus, each of the magnetic devices in FIG. 6 includes a long magnetic circuit branch A and a short magnetic circuit branch B connected between the ends of magnetic circuit branch A. In addition, each device includes a second short branch B′ which is also connected between the ends of the branch A. The device thus defines a large aperture and a small aperture. This device may otherwise be considered to include a magnetic core defined by the branches B and B′ with a further magnetic branch extending between two points on such core. The cross-sectional area of the magnetic path in the long branch A is twice the area of the magnetic path cross section in each of the short paths B and B′ as indicated by the dimensions $2d$ and $d$ on the drawing.

Each device in FIG. 6 is in its blocked, or ZERO, state when all of the flux in all of the branches is poled in the counterclockwise direction around the large aperture as indicated in the device of section 3. The device is in its ONE condition when branches B and B′ are magnetized in the clockwise direction around the small aperture, with the inner portion of a large branch A being magnetized in the clockwise direction around the large aperture, and the outer portion in the counterclockwise direction so that the inner and outer flux paths of large branch A cooperate to form a closed magnetic flux loop. An intermediate condition, illustrated by device 20, has counterclockwise flux around the small aperture with the oppositely poled flux portions in branch A unchanged from the condition shown for device 19. This also may be considered to be a ONE condition since branch A is the storage device while the B and B′ branches are parts of the coupling means between branches.

The device is transferred from the ONE condition to the ZERO condition in a step-step operation by applying successive pulses of opposite polarity to a winding on the B′ branch for first reversing the direction of magnetization around the small aperture and then switching the entire device flux to the counterclockwise direction. Arrows on the various device branches in FIG. 6 indicate an assumed initial condition for each device wherein the device 19 in section 1 is in the binary ONE condition; the device 20 in section 2 is in the intermediate condition wherein flux around the small aperture has been reversed; and the device 21 is in the ZERO condition. In the operation considered here, the flux in the outer portions of the branches A is always counterclockwise around the large aperture. It must be understood, however, that the illustrated magnetization directions afford an aid in the explanation of the operation and are not to be considered a conclusion as to the physics of operation within a device.

Shift circuits are provided as in the toroidal core embodiment of FIGS. 2 and 5, but in this case each circuit directly engages only the large branch of a device. Bias is provided by a battery 16 and a lead 17 which links all of the large apertures in a direction such as to tend to establish clockwise magnetization around the large apertures. Choke coil 18 is also provided. The size of the bias current is only sufficient to generate the field in branches A which is just short of the field required to switch magnetization to the clockwise direction in the inner portions of such branches adjacent to the large aperture.

During phase one the current pulse in shift circuit S1 switches the inner portion of branch A to the counterclockwise direction. The resulting field appearing at the ends of branch $A_1$ exceeds the coercive field for branch $B_2$ and reverses the polarity of magnetization therein so that the entire device 19 is now magnetized in the counterclockwise direction around the large aperture. This places the device 19 in the ZERO condition. The switching of magnetization polarity in branch $B_2$ generates a clockwise loop current in coupling loop C1 which engages both branch $B_2$ and branch $B_2'$ in device 20.

The clockwise current in coupling loop C1 reverses magnetization in branch $B_2'$ to establish in that branch clockwise magnetization around the small aperture of device 20 (counterclockwise around the large aperture). Magnetization in branch $B_3$ is also reversed so that clockwise magnetization now prevails around the small aperture of device 20. No change takes place in the magnetization of branch $A_2$ because any tendency to the inner portion thereof to reverse to the counterclockwise direction when small branch $B_2'$ reverses is opposed by the bias field generated by current in bias lead 17.

The switching of branch $B_3$ generates a counterclockwise current in coupling loop C2 which links branch $B_3$ in device 20 and branch $B_3'$ of device 21. The counterclockwise current reverses the magnetization of branch $B_3'$ to establish counterclockwise magnetization therein around the small aperture of device 21 (clockwise around the large aperture). Since branch $B_4$ is already in the counterclockwise direction around the small aperture it does not change as a result of the switching of branch $B_3'$. However, the inner portion of branch $A_3$ does switch to the clockwise direction around the large aperture of device 21 thereby providing a closed flux path for the flux in branch $A_3$.

It will be noted that during the first phase of shift operation in the circuit of FIG. 6 there was no flux reversal in branch $B_1'$ of device 19 or in branch $B_4$ of device 21, and there are therefore no currents induced in the input and output circuits for the illustrated shift register stage. Thus, the propagation of signals is confined within the three sections of the illustrated shift register stage as desired. It is also noted that during the first phase the ONE condition of branch $A_1$ is leapfrogged over the anchor branch $A_2$ and established in the branch $A_3$.

During the second shift phase the current pulse in shift circuit S2 reverses magnetization polarity in the inner portion of branch $A_2$ to establish counterclockwise magnetization around the large aperture of device 20. This action also reverses the magnetization in branch $B_3$ a second time thereby establishing device 20 in the ZERO condition since branch $B_2'$ had been magnetized during the first phase in the counterclockwise direction around the large aperture (clockwise around the small aperture). The second reversal of flux in branch $B_3$ generates a clockwise current in coupling loop C2 which causes branch $B_3'$ to be reversed again. This action causes magnetization of branch $B_4$ to reverse, thereby completing clockwise magnetization around the small aperture of device 21 and generating a counterclockwise current in the output coupling loop from the circuit of FIG. 6.

During the third phase of the shift operation, the shift current pulse in circuit S3 reverses magnetization in the inner portion of branch $A_3$ thereby producing a further reversal in branch $B_4$ for establishing in device 21 the complete counterclockwise magnetization which is characteristic of the ZERO condition and generating a clockwise current pulse in the output circuit loop. All three sections of the stage in FIG. 6 are now in the ZERO condition if no write-in signals have been applied to the input circuit. If, however, write-in signals have been applied they would appear as a counterclockwise loop current in the input circuit during phase two and a clockwise loop current in the input circuit during phase three.

*Improving speed and operating margins*

The three-phase shift register embodiments hereinbefore described utilize different core sizes and bias circuits to help control spurious switching of cores that must be shuttled by switching currents but which are not supposed to switch even though the shuttle current may be in a direction tending to cause switching. Mutual couplings with step-up turns ratios are used to obtain the gain necessary to overcome losses, but the arrangement of turns ratios is relatively simple because of the relatively simple coupling arrangement between register sections.

The possibility of spurious switching of shuttled devices in the described register can be considerably reduced by providing additional storage devices, with an increase in the number of shift phases, in the register so that drive currents from a transmitting storage device to a receiving storage device are, in the current return path, split among multiple circuit paths. However, increasing the register phases increases the complexity of the interplay among couplings between register sections so that such register systems, and their benefits, are generally avoided by designers. In accordance with the present invention, it has been found that the three-phase register of FIG. 2 herein is the lowest phase order embodiment of a family of registers having other higher phase order embodiments, and wherein the margin against spurious operation increases with increase in the phase order.

All of the member registers of different phase orders in the aforementioned family are readily derivable by a logical equivalent circuit type of approach. Once a certain phase order embodiment has been derived, different modifications thereof can be formulated to achieve maximum manufacturing convenience for different situations. The equivalent circuit representation for any given phase order register is also the basic information transmission circuit for such a register if it employs bipolar magnetic devices, e.g., anisotropic magnetic thin films, having inherent gain. For unipolar devices, e.g., toroidal cores, the basic equivalent circuit must be modified to insert gain-producing means; but in accordance with the present invention a relatively easy-to-follow procedure is available for determining how to produce the needed gain by turns ratios and/or magnetic path-length arrangements. Consequently, the use of higher phase order circuits to achieve desired margin is more conveniently available. The procedure for deriving the mentioned equivalent circuits and for adding turns ratios when required is hereinafter outlined. The discussion will be developed in terms of unipolar toroidal cores; but other types of devices, either unipolar or bipolar, can be employed.

It has been found that in a shift register maximum energy gain and speed of operation over plural phase positions are available when the register is characterized by substantially identical energy gain and speed of operation for each phase position thereof. Consequently, it is desirable that each phase position of the register should be identical to every other and that any operation accomplished on one phase position should likewise be subsequently carried out on every other phase position. This means, of course, that registers of the class should have identical connection circuits for each phase position in a multiphase arrangement. A plurality of the phase position circuits are combined, as shown for example in FIG. 1, to form a bit storage position, or stage, of a shift register. In the absence of interstage storage means each register stage must be able to transmit and receive information at the same time.

In any shift register it can be shown that the ratio of magnetic material volume of receiving cores to material volume of cores in the current return path for a stage of the register determines the gain and the speed of information transfer between transmitting and receiving storage cores. Thus, if the ratio is less than unity the return path cores have the larger total volume and require a correspondingly larger total magnetomotive force for switching than do the receiving cores. There is then less danger of spuriously switching the information state of return path cores. The volume ratio also determines the tolerances associated with external drive signals applied to the various register cores. If the material volume ratio can be decreased, operating speed increases; but heretofore no practical way was known to achieve such an advantageous ratio in shift register involving more than a few information transfers.

It is assumed throughout this discussion that the shift register will have a single transmitting core and a single receiving core. In an $m$-phase embodiment $m$ distinct storage elements are required, one to act as a receiver and one as a transmitter on each transfer phase, i.e., during each resetting of a storage device by a shift signal the information stored therein is transferred to another device. During a given transfer phase the $m-2$ remaining storage elements in a stage are coupled to transfer current return paths for returning the information transfer current from the receiving device back to the transmitting device. In the three-phase circuit the leapfrogged storage device performed this function as will hereinafter be further considered.

It can be shown that the shift register circuit of FIGS. 1 and 2 conforms to an algorithm for circuit construction utilizing an equivalent circuit approach to optimize signal transfer current. Thus, the three-phase circuit of FIG. 2 has an equivalent primary circuit. The latter circuit can be modified by adding additional storage cores and drive phrases in a way which increases the available transfer current from a transmitting core of the register without significantly changing the impedance of the receiving stage. Consequently, the material volume ratio of the register is decreased with the result that the gain per stage is increased and the speed of operation of the register is increased. This register modification requires additional hardware, but it gives the designer a degree of flexibility that he lacked before because he can now select an advantageous comprise between hardware cost and speed of operation.

In accordance with the aforementioned algorithm, an $m^{th}$ phase order system utilizes $m$ drive phases per stage and $m$ storage devices per stage, i.e., per information bit. $m-1$ of the storage devices are actually utilized at any one time for storing information. This leaves one storage device free to function as a receiving device so that each register stage may simultaneously transmit to a succeeding stage and receive from a preceding stage as required for register operation. The expansion from the third phase order shift register to a higher phase order to gain a decreased volume ratio requires additional series information transmission paths having storage cores. Information is shifted along each such path between the first and last, i.e., the $(m-1)^{th}$ core after the first, cores of a stage in the same path. In each such shift the transmitted information leapfrogs by other cores in the stage in other series paths.

Drive signals are successively applied in different phases to the storage cores of a stage in a rotating sequence of the series paths. For example, referring to FIG. 1, the third phase order shift register there illustrated employs three storage cores per bit and three drive phases, i.e., $m=3$ for the register of FIG. 1. Consequently, $m-1=2$ for the shift register of FIG. 1 so that two storage cores are actually used to store an information bit at any one time. Likewise, two series information transmission paths are provided in that register. The first such path includes the odd numbered loop circuits L1, L3, et cetera, and the second path includes the even numbered loop circuits L0, L2, et cetera. Thus, within a stage of the register the shift signals are successively applied to those first and second paths in rotating sequence as cores $a_1$, $a_2$, and $a_3$ are driven in succession.

Further in accordance with the aforementioned algorithm, the addition of series information transmission paths is equivalent to the addition of multiple return current paths equal in number to $m-2$ and which share a total information transfer current. The equivalence will now be considered.

*Developing a primary network*

Development of higher-phase order circuits is first considered in a skeletal, or so-called primary, network form in which two turns ratios are included. Ideally a circuit would operate in this equivalent circuit form if there were no resistance or flux losses. This circuit form is simply derived from FIG. 1 by:

(a) Considering $n$ (turns) equal to one on all blocking cores as shown in FIG. 7A.

(b) Primary and secondary windings are now unnecessary on blocking cores except in regard to electrically isolating one loop from another. However, it can be seen that there is no electrical potential difference between adjacent loops so that isolating action is unnecessary. Therefore, primary and secondary windings can be combined into one circuit, thereby directly joining node points such as 2″2′2 and 3″3′3 in the various loops as seen in FIG. 7A. This produces the primary network as shown in FIG. 7B.

Figure 7B:
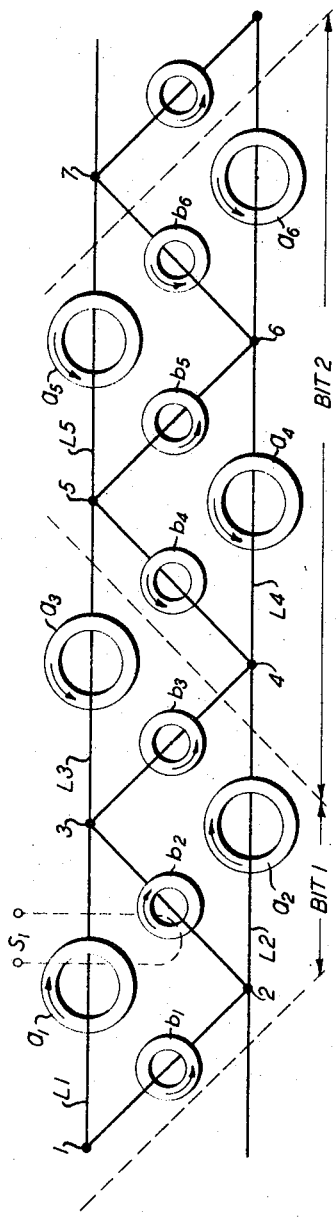
Figure 7C:
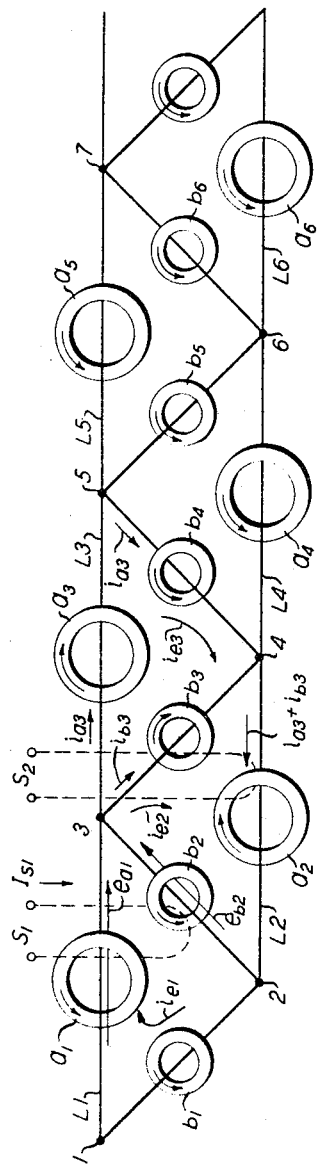

The information ONE bit is shown in the circuits of FIGS. 7A and 7B the same as in FIG. 1. The operation of the primary network of FIG. 7B, neglecting losses, is essentially the same as that discussed for FIG. 1. This similarity can be seen in the following outline description. If the drive winding $S_1$ in FIG. 7B is energized as shown in FIG. 7C, the ONE information states of elements $a_1$ and $b_2$ are reset, and equal voltages $e_{a1}$ and $e_{b2}$ are induced across nodes 1 and 3 and nodes 2 and 3, respectively, as shown in FIG. 7C. Drive magnetomotive forces are adjusted by selecting differing turns on shift windings $S_1$ for cores $a_1$ and $b_2$ so that core $a_1$ tends to switch slightly faster than does core $b_2$. Then the net loop current $i_{e1}$ in loop L1 is clockwise so that element $b_1$ in the clear state is shuttled and acts essentially to short node 1 to node 2. This latter action stops reverse propagation at nodes 1 and 2. The voltage $e_{b2}$ causes a clockwise current $i_{e2}$ around loop L2, switching element $b_3$, which in turn causes a clockwise loop current $i_{e3}$ in loop L3. The latter effects switching in the receiver storage element $a_3$ and blocking action, or shuttling, in element $b_4$. So forward propagation is stopped at nodes 4 and 5.

Note that with no losses, as previously assumed, the total flux switched in setting elements $a_3$ and $b_3$ must be equal to the flux switched in resetting elements $a_1$ and $b_2$. However, it is clear in FIG. 7C that the return current path for the switching branch currents $i_{a3}$ and $i_{b3}$ is through element $a_2$ and in a direction to cause switching toward the reset state in this element. The principles of conservation of energy dictate that any such spurious reset switching in core $a_2$ will reduce energy available to the receiving cores, i.e., reduce the signal flux $\varphi_{b3}$ and $\varphi_{a3}$ that can be switched. Thus, a partial loss of information would occur, and this effect must be avoided. The bias magnetomotive forces which aid switching to the set condition in cores $b_3$ and $a_3$ and prevent switching to reset in cores $a_2$, as discussed in connection with FIGS. 2 and 5, also assist in avoiding the spurious switching. In addition, it is necessary in the circuits of FIGS. 2, 5, and 7C to adjust the magnitude of drive signals $S_1$ so that the sum of $i_{a3}+i_{b3}$ is not greater than the biased threshold of element $a_2$. Hence, the coercive force threshold of a core coupled to a return current path will act to limit the maximum usable transfer current for each shift phase. In other words, the power transfer per phase is limited by the total magnetic theshold of the drive current return path. The object of the subsequent discussion herein is to show how this limit can be increased by providing multiple current return paths through elements storing information such as the core element $a_2$.

The drive, or transfer, current return path is clearly identifiable as such in FIGS. 7B and 7C which are completely direct-current coupled. An equivalent return current branch circuit is included in the circuits of FIG. 7A and in FIG. 1 which have inductively coupled loops. For example, in FIG. 1 the loop current $i_{21}$ causes core $b_3$ to be switched as already described; and it also causes, by coupling through core $b_3$, the core $a_3$ to be switched. It can be shown by known circuit analysis techniques, therefore, that the loop current $i_{21}$ in FIG. 1 corresponds to the current $i_{a3}+i_{b3}$ in FIG. 7C, and that the circuits of cores $a_2$ in both cases comprise return current paths which are equivalent to one another for the information transfer operation. Accordingly, current return paths are hereinafter considered to include intermediate core circuits, such as the circuit of core $a_2$, between a transmitting portion of core circuits that are driven to generate an information transfer signal and a receiving portion of core circuits that are actuated in accordance with the information significance of such transfer signal, regardless of whether such return paths are in a direct-current coupled network as in FIG. 7C or in an inductively coupled network as in FIG. 7A and regardless of the number of operating phases used for the over-all circuit.

Note in FIG. 7C that after the first transfer phase the disposition of information-indicating flux is in exactly the same pattern as theretofore but displaced to the right by one phase position. That is, information now lies in elements $a_2$, $b_3$, and $a_3$ instead of $a_1$, $b_2$, and $a_2$. The second transfer phase drive signal $S_2$ can now be applied to effect another such shift and the third drive $S_3$ after that. During each transfer phase, the pattern of functions being performed by storage and blocking cores in each bit position is the same. For example, during drive $S_1$ in FIG. 7C, blocking cores $b_1$ and $b_4$ at the inputs to adjacent bit positions serve to isolate transfer currents to the associated set of transmitting and receiving core loops. One storage element $a_1$ and an internal blocking element $b_2$ are used as transmitters in a bit position while another storage element $a_3$ and an internal blocking element $b_3$ act as receivers in the same bit position. The remaining storage element $a_2$ acts as the limiting, transfer current, return path.

The functions of the various cores change cyclically as information is shifted through the register so that bit positions are not structurally defined in a fixed manner as they are in many prior art registers. However, the phase position structure is defined and is utilized to build up multiphase netwoks comprising a register of the desired length. The register is built up in iterative fashion on a node by node basis. Each phase position includes a node with one storage element and one blocking element coupled to separate branches from the node. The generating rules for connecting these elements in the three-phase circuit are as follows:

Rule (a) Each storage element $a_1$ directly joins a node $i$ to a node $i+2$.

Rule (b) Each blocking element $b_1$ directly joins the node $i$ to a node $i+1$.

The primary circuit, e.g., FIG. 7C, formed by these rules represents a symmetric class of circuits in that the circuitry of each phase position is exactly the same as all the others.

*Development of networks of different phase orders*

The primary networks of higher phase order registers of the mentioned class of phase-symmetric registers can be obtained by extending the aforementioned generating rules to include the general phase order factor $m$. To this end the significance of phase order in the three-phase, i.e., $m=3$, network must first be considered. In one bit position, i.e., bit 1 of FIG. 7A, it is seen that there are $m$ storage elements, $m$ blocking elements and $m$ nodes. The last numbered node in the bit position, or node $i+m-1$ for a position beginning at node $i$, acts as the single internal node connecting transmitting and receiving elements. The remaining $m-1$ nodes all appear as input nodes for current from a previous bit position.

Since in the higher phase order schemes one still wishes to activate only a single transmitting element and a single receiving element, the close transmitter-to-receiver coupling of the three-phase circuits is retained in circuits of higher phase orders. In other words, intermediate storage between transmitting cores and receiving cores is placed in the return current path for transfer current rather than in the forward coupling path. Rule (a) is then restated as:

Each storage element including a core $a_i$ directly joins node $i$ and node $i+m-1$.

Since the register is to be symmetric this rule serves to define the location of all storage elements utilized in the phase positions needed for a register of the desired length. A full bit position includes $m$ such storage elements.

The primary function of the blocking element $b_1$ will remain the same as in the three-phase example, i.e., to shuttle, or in effect short circuit, input node points of bit positions during a transfer. Thus, Rule (b) is the same as before:

Each blocking element $b_i$ directly joins the node $i$ and node $i+1$.

The complete primary information transfer network is derived as shown in FIG. 8A for $m=4$.

In FIG. 8A, which has been extended so as to store two full bits of information (nodes 1 to 8), a ONE signal has been shown in the first bit position. The disposition of signal-representing flux states for a ONE can be determined from the three-phase example. In general $m-1$ successive storage elements are left storing a ONE while the $m_{th}$ element is left free to act as a receiver. If the first bit storage location is $a_i$ then blocking elements $b_i$ to $b_{i+m-3}$, inclusive, are left clear to prevent reverse propagation in the $m>3$ version. Blocking element $b_{i+m-2}$ is in the ONE condition and is used together with storage element $a_i$ as a transmitter on a particular phase while blocking element $b_{i+m-2}$ is left clear to act as a receiver with storage element $a_{i+m-1}$.

The characteristic signal transfer opeartion in one phase of a four-phase system, but which is identical for all phases, is herein described with reference to FIGS. 8A and 8B. Drive $S_1$ is applied to elements $a_1$ and $b_3$ in the first bit position as shown in FIG. 8A. It is also applied, but not shown, to elements $a_5$ and $b_7$ in the second bit position, and it is similarly applied to corresponding cores in other bit positions. Equal induced voltages $e_{a1}$ and $e_{b3}$ act in parallel, as indicated by dotted arrows in FIG. 8B. Elements $b_1$ and $b_2$ which block signal propagation to the left act as shuttled or short circuit paths. Elements $a_4$ and $b_4$ switch with voltage $e_{b3}$ impressed across their terminals. No switching occurs in element $b_6$ due to the direction of receiver current as shown. Similarly, elements $b_1$, $b_2$, and $b_5$ are merely shuttled by a portion of the receiver current $i_{a4}$. Core $a_4$ requires a much larger current for switching than does core $b_4$. Consequently, the current $i_{a4}$ is much larger than the current $i_{b4}$; and it controls the condition of core $b_5$.

Figure 8B:
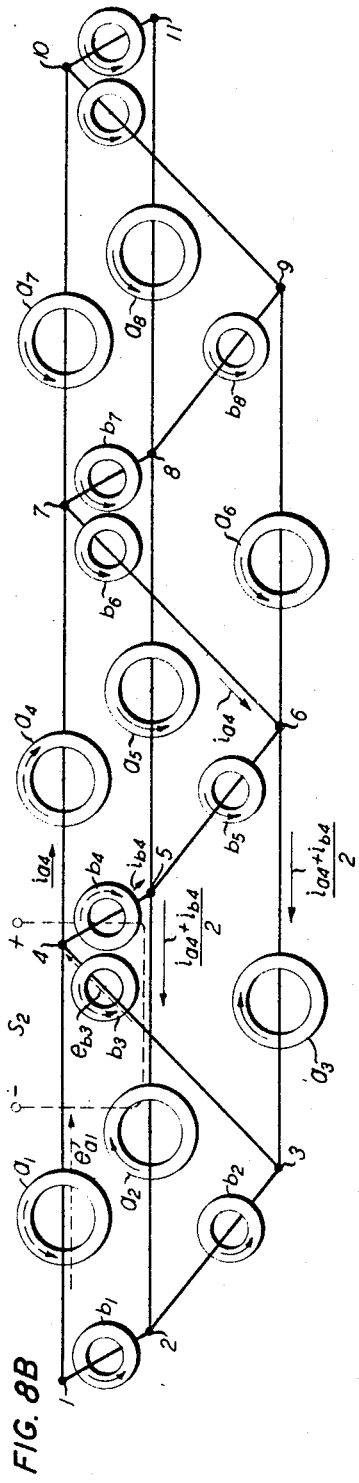

The total receiver current $i_{a4}+i_{b4}$ in FIG. 8B on shift signal $S_1$ is approximately evenly split between the two current return paths through elements $a_2$ and $a_3$. Thus, with these two paths the transfer current upper limit, below which no spurious switching of information occurs in cores $a_2$ and $a_3$, is doubled over that in the three-phase example. Note also that since elements $b_5$ and $b_6$ are blocked while information is being shifted from $a_1$ to $a_4$ by shift signal, $S_1$, a ONE or ZERO can simultaneously be shifted in the same manner from element $a_5$ to $a_8$ by shift signal $S_1$. In other words, bit transmissions in adjacent bit positions are isolated from one another by the blocking elements $b_5$ and $b_6$. Furthermore, because of the phase symmetry of the circuit, cores $b_5$ and $b_6$ are also shuttled by the return current $i_{a5}$ of core $a_5$ in the next bit position if it were storing a ONE prior to the drive phase signal $S_1$.

At the conclusion of the tarnsfer operation just outlined, the ONE signal flux has been moved to elements $a_2$, $a_3$, $a_4$, and $b_4$ from its original position in $a_1$, $a_2$, $a_3$, and $b_3$, i.e., to a position with all node numberings incremented by one. Thus, if no flux has been lost in the process, the next shift operation can be performed exactly as the first but with drive winding $S_2$ (linking elements $a_2$ and $b_4$) energized as shown in FIG. 8B. Two further such shifts are then required to move the information through the remainder of a complete bit position. It can be seen by analogy to the discussion of the three-phase circuit that the four-phase circut includes three information transmission paths and that within a bit position in the register the shift signals are applied to the storage devices of the different paths in rotating sequence. The first path includes nodes 1, 4, 7, and 10; the second path includes nodes 2, 5, and 8; and the third path includes nodes 3, 6, and 9. The application of shift signals in the position for bit 1 is to the three paths in the rotating sequence represented by cores $a_1$, $a_2$ $a_3$, and $a_4$.

The derivation of networks of higher phase order than the fourth follows directly from the method just outlined. Clearly, with five phases three current return paths are available. Thus, each phase transfer can be accomplished at a higher transfer current level without loss of information flux. Hence, the allowed margin in shift current amplitude range increases. Note that the lower bound on shift currents is the same for all phase orders since it is the drive which will induce a transfer current above the threshold for switching of one storage element and one blocking element in the receiver section of the register. With higher allowable transfer current levels in circuits with four or more phases, the time required per transfer between cores is reduced with respect to the three-phase circuit. More transfers are required per bit shift, but note that in practice it has been found that there is a great deal time saving in putting $b$ bits through $n$ stages of a higher phase order register.

*Alternative storage devices*

In the network derivation included herewith, simple torodal cores of ferrite material have been used for purposes of illustration. The networks, however, are suitable for various other magnetic element configurations. For example, a direct analytical correspondence can be made between the simple core topologies and those of networks using multiapertured magnetic elements. Several equivalent multiapertured arrangements can be shown for one primary network, and one example was discussed in connection with FIG. 6 for the three-phase circuits. Alternatively, it is known that other magnetic elements of a bipolar signal handling nature can be used in substitution for the simple ferrite cores. With these a flux condition of a first polarity can be used to represent a ONE, an oppositely polarized flux condition represents a ZERO, and a neutral or null flux condition represents the no-information state. Transmission of ZERO states occurs in a manner identical to that described for ONES with all currents, flux, et cetera, reversed in polarity. In bipolar schemes blocking elements generally require a holding field applied externally to prevent them from switching. Magnetic thin films, as in the R. M. Wolfe Patent 3,175,185, and balanced bipolar ferrite elements filed Nov. 30, 1962, now U.S. Patent 3,376,562 which as in the E. E. Newhall application Ser. No. 241,339, issued Apr. 2, 1968, and entitled "A Magnetic Core Shift Register," are two members of the class of such bipolar devices.

*Gain inserted as flux increments*

In discussing the operation of the primary network examples herein it has been assumed that coupling wires and magnetic elements, when driven between specified limits, are lossless. In practice this is not the case. The use of ferrite core elements in a network connected as in the described primary circuits results in essentially the same mode of operation although with gradual lowering, by each subsequent transfer, of the signal flux level. When using anisotropic film elements this does not occur as it has been demonstrated that the elements themselves have the ability to regenerate a stable signal flux level as taught in the mentioned Wolfe patent. With most other devices, however, multiple windings incorporating turns ratios are employed to provide a net signal flux gain in spite of losses. In addition, it is often found necessary to increase signal energy levels for increasing either magnetic path length or the flux path cross-sectional area, or both, of the switching elements. The means for designing such multiple winding configurations so as to maintain symmetry in multiphase operations is not evident with systems higher than the third order. The following discussion shows the necessary analytical procedures for conveniently adding turns ratios for circuits with any number of phases.

From the foregoing discussion of the primary, or direct coupled, networks it can be seen that a given information signal (a ONE signal in the unipolar element examples of FIGS. 7 and 8) must give rise to induced branch voltages $e_{a1}$, for example, appearing in the network at information signal transfer times. Furthermore, in a particular transfer any branch which is required to switch either to the information state or back to the clear state must, if lossless conditions prevail, exhibit the same voltage drop as every other branch. In a symmetrically designed system in which each transfer occurs at the same rate and for the same duration, it is further evident that, regardless of the phase time at which switching occurs, the same voltage waveform should appear across any branch in the network when that branch is induced to switch. This can be seen for the network of FIG. 8A, where on the first phase as described, element $b_3$ switches with element $a_1$ thereby requiring equal voltages between the node pairs 1, 4 and 3, 4. However, due to the symmetrical drive arrangement, it is also noted that element $b_3$ was set to the ONE state on the phase previous together with element $a_3$. Thus, $e_{b3}$ on this phase ($S_1$) equals $e_{a3}$ that had been produced on a previous occurrence of phase $S_3$. Since no flux or integrated volt-second signal is lost between phases it is then clear that:

$$\int_{\tau_0} e_{b3}dt = \int_{\tau_0} e_{a3}dt = \int_{\tau_1} e_{a1}dt = \int_{\tau_1} e_{b1}dt \quad (1)$$

Consideration of all phases in turn then yields the constraint on the direct coupled networks of FIG. 8A that all volt-second switching signals are equal, i.e., $$\int_{\tau_i} e_{ai}dt = \int_{\tau_j} e_{aj}dt = \int_{\tau_i} e_{bi}dt = \int_{\tau_j} e_{bj}dt \quad (2)$$

for all phase positions $i$ or $j$ where $\tau$ is the switching time of a storage or blocking device. Since $$e = n\frac{d\varphi}{dt}$$

where $d\varphi/dt$ is the rate of change of signal flux $\varphi$, then $\int e_{ai}dt = n_i\Delta\varphi_i$, $n$ being the number of circuit turns linking a magnetic device being switched and $\Delta\varphi$ being an incremental signal flux switched.

Let $\psi_i$ represent a signal flux linkage:

$$\psi_i = n_i\Delta\varphi_i \quad (4)$$

Hereinafter the $\Delta$ is dropped and $\varphi_i$ is understood to represent $\Delta\varphi_i$. Thus, for all blocking and storage elements in a direct coupled network, the Equations 1 through 4 yield the constraint that:

$$\psi_j = \psi_i \quad (5)$$

Clearly if a uniform flux gain per phase $\eta$ were to be obtained in each transfer through a long direct coupled network such as that in FIG. 8B:

$$\begin{cases} \varphi_{aj} = \eta^{j-i}\varphi_{ai} \text{ for } j > i,\ \eta > 1 \\ \varphi_{bj} = \eta^{j-i}\varphi_{bi} \text{ for } j > i,\ \eta > 1 \end{cases} \quad (6)$$

from Equations 4 and 5 this would require an impractical exponential decrease in the numbers of turns on succeeding elements through a long register:

$$\begin{cases} n_{aj} = \dfrac{1}{\eta^{j-i}}n_{ai} \\ n_{bj} = \dfrac{1}{\eta^{j-i}}n_{bi} \end{cases} \quad (7)$$

It has been demonstrated for the three-phase circuit that the long direct coupled network is equivalent to a similar network of plural inductively coupled circuit loops. This equivalence provides a practical alternative to long direct coupled networks with exponentially decreasing turns. The alternative is to construct the register with many smaller, isolated, direct coupled loops and rely on mutual coupling between different windings on a coupling core to form a circuit connection essentially equivalent to that of the direct coupled circuit. In the case where loops are coupled by mutual inductance, Equation 5 applies to only the flux linkages within any one such direct loop. Hence, the various loops for the three-phase circuit can be designed separately using Equations 5 and 6. Usually this will be done symmetrically, i.e., all loops being designed identically, one for each phase.

The essential factor in selecting a coupling loop is, of course, that it can be congruent with a loop already present in the primary network since otherwise a new effective current path not present in the primary circuit would be established changing the mode of signal transfer. Some possible coupling loops for a four-phase register are shown by broken and dotted lines in FIG. 9A. Note that each branch in the loop which runs parallel to a primary network branch must link the core element in that branch. In addition, with all phase loops completed, every primary network branch must appear in at least one loop.

To further illustrate the design technique it is convenient to consider the case where all storage cores in the register are identical in size, shape, and material. Blocking cores are likewise designed to be identical to one another but different from storage cores as noted for coupling cores for FIG. 1. A flux gain of $\eta > 1$ is to be provided to counterbalance the unavoidable losses in the register due to such effects as signal IR drops and partial spurious switching to give an over-all signal transmission gain of unity through a shift register. The congruent loop configuration of FIG. 9B is chosen from those of FIG. 9A since it appears to link as few cores as possible, i.e., cores $a_1$, $b_1$, $b_2$, and $b_3$; and it will, therefore, involve the lowest number of phase positions and the lowest $j-i$ spread in exponents for Equation 7. The entire register will be reformed using identical loops of this type as shown in FIG. 9C. The polarity of linking windings must be chosen consistently as shown in FIG. 9C where all windings go through the holes in the cores from top to bottom when tracing them from leftmost to rightmost ends of the branch.

For reasons earlier discussed, the flux linkage constraint of Equation 5 must apply to all elements connected within any one of the short generating loops of FIG. 9C. Further, design Equations 6 again apply to all elements of the same type, either storage or blocking, within the loop. $\eta$, or the flux gain per phase, must be obtained from a prior knowledge of expected losses in wires and cores as is usually the case in design work. Thus, Equations 7 are again obtained specifically for the loop L1 in FIG. 9C so that:

$$n_{b3} = \frac{n_{b2}}{\eta} = \frac{1}{\eta^2} n_{b1} \quad (8)$$

Turns $n_{a1}$ for storage core $a_1$ can be chosen relative to the turns $n_{b3}$ in accordance with Equation 5 alone, i.e., $$n_{a1}\varphi_{a1} = n_{b3}\varphi_{b3} = n_{b2}\varphi_{b2} = n_{b1}\varphi_{b1} \quad (9)$$

Since equivalent loops are to be used for manufacturing convenience for all phase groupings of elements, the nodal subscripts in Equations 8 and 9 can then be replaced with general subscripts $i$, $i+1$, et cetera when considering the turns in Loop Li to reflect the precession of loop position in successive phase positions, $$n_{bi+2} = \frac{n_{bi+1}}{\eta} = \frac{n_{bi}}{\eta^2} \quad (10)$$

$$n_{ai}\varphi_{ai} = n_{bi+2}\varphi_{bi+2} = n_{bi+1}\varphi_{bi+1} = n_{bi}\varphi_{bi} \quad (11)$$

To further illustrate this example consider a register designed with storage cores having a capacity of $x$ units of flux and blocking cores with a capacity of $.75x$ units of flux. The estimated flux gain required per phase is advantageously selected to be 1.5.

Then from Equation 8:

$$n_{b3} = \frac{n_{b2}}{1.5} = \frac{n_{b1}}{2.25} \quad (12)$$

$$n_{a1} = \frac{.75}{1} n_{b3} \quad (13)$$

Clearly from a manufacturing standpoint it is desirable to have turns values satisfying Equations 12 and 13 which are integral, and the lowest integral values are thus:

$$n_{b1} = 9$$
$$n_{b2} = 6$$
$$n_{b3} = 4$$
$$n_{a1} = 3$$

A complete register wired with coupling loops of this type is shown with mirror symbols in FIG. 10 including all bias and shift windings. Note that the shift windings $S_1$ through $S_4$ are placed on the cores as indicated in FIGS. 8A and 8B but with two turns on the storage cores and one turn on the blocking elements. The choice of turns for applying shift signals is not restricted by flux gain and symmetry constraints but was found convenient for manufacture.

At the input of the register of FIG. 10 is shown an information write-in circuit not discussed heretofore. The primary networks shown in FIGS. 8A and 8B were considered as sections in a long register so that initial information patterns given were the assumed result of four previous phase transfers. At the input end of a register a single phase write-in is more convenient, in terms of external pulse equipment for inserting the desired information pattern, than is a multiphase write-in. This is the function of the "Initial Write-in" winding shown in FIG. 10. Clearly, a pulse drive winding linking each of cores $a_1$, $a_2$, $a_3$, and $b_3$ so that they could be fully switched by a current pulse would serve this purpose; however, one would then have to rely on dimensional accuracy of the initial elements to insure equal signal storage in all elements. The winding shown, which links element $a_1$ with four turns, element $b_1$ with two turns, and one turn on element $b_2$, performs the same task but relies on induced loop currents resulting from the switching of element $a_1$ to provide corresponding signal levels on element $a_2$, $a_3$, and $b_3$.

The path of the FIG. 10 currents induced on write-in is shown on FIG. 11 where it can be noted that the two-turn and one-turn portions of the write-in circuit are found sufficient to prevent unwanted switching in elements $b_1$ and $b_2$ due to induced write-in currents. Write-in in this manner is performed during the drive phase when drive signal $S_4$ performs the added function of holding element $a_4$ in the clear state. A bias winding, which is advantageously used to enhance the performance of the register as in the three-phase example, is not shown in FIG. 11 as are the remaining drive windings which are inactive during write-in. Several alternative write-in winding arrangements are clearly possible.

Gain by magnetomotive force increments

For practical purposes such as the following it is often desirable to provide gain in the form of magnetomotive force, e.g., magnetic element path length, increments as well as, or alternative to, flux increments, e.g., by circuit turns or element flux path cross-sectional area:

(1) To provide fan-out in a parallel connection, i.e., to two or more receiving shift registers, or logic devices, from one register.

(2) To properly match the output current and voltage to the input impedance requirements of a load.

(3) To avoid the use of higher order exponential turns levels on circuits as are sometimes required for flux increments only or to allow the use of low order integral turns levels. For example, if in one circuit loop the turns can be proportioned with only two levels of turns such as $\eta^3$ and 1, rather than the three levels if an $\eta^2$ level is also needed, then the designer is free to use unity for the lower level and any convenient number such as two turns for $\eta^3$.

Considering the ease with which turns ratios can be used to provide impedance matching in magnetic circuits in general, the use of magnetomotive force as well as flux gain in a magnetic register is reasonable, and it is often operationally convenient. Safeguards, however, should be taken in the symmetric class of circuits using magnetomotive force and flux gain as well as in those using only flux gain, as previously described, if it is desired to retain the uniformity of transfer phases with regard to factors such as transfer speed and power transfer.

It can be shown directly that the symmetry requirements are most conveniently achieved by requiring:

(a) The use of a phase symmetric primary network as previously derived;

(b) The adjustment of drive $s$ and proportioning of turns and linear circuit parameters (such as leakage inductance and wire resistance) so that each core of a given type (either blocking or storage) will be operated with identical excursions in net field intensities $H_{ai}$ or $H_{bi}$, and identical excursions in signal flux densities $B_{ai}$ or $B_{bi}$; and (c) The use of identical bulk material and geometric type, but with different dimensions on various devices. Conditions (b) and (c) alone indicate that identical switching times are obtained in all elements throughout the network since switching properties are fixed for the materials in terms of B and H input variations.

For either a blocking or a storage element at the time of write-in, energy requirements are obtained as follows:

$$e_i(t) = n_i \varphi_i(t) = n_i A_i \dot{B}_i(t) \tag{14}$$

$$i_i(t) = \frac{MMF_i}{n_i} = \frac{l_i}{0.4\pi n_i} H_i(t) \tag{15}$$

where $e_i(t)$ is the terminal voltage across $n_i$ turns on the element when switching, $\varphi_i(t)$ is the rate of change of flux switching in that element, $\dot{B}_i(t)$ is the rate of change of flux density.

$A_i$ is the net cross-sectional area of the core flux path, $MMF_i(t)$ is the net magnetomotive force of the $n_i$-turn winding with current $i_i(t)$ flowing, i.e., $n_i i_i(t)$, $l_i$ is the mean magnetic path length of the element, $H_i(t)$ is the net field intensity due to $i_i$.

$$H_i(t) = 0.4\pi \frac{MMF_i(t)}{l_i}$$

The energy requirement for switching the element is then:

$$W_i = \int_{\tau_i} e_i i_i dt$$

By substituting in the above from Equations 14 and 15:

$$W_i = \frac{A_i l_i}{0.4\pi} \int_{\tau_i} \dot{B}_i(t) H_i(t) dt \tag{16}$$

where $\tau_i$ is the switching time of the element. Clearly if $\dot{B}_i(t)$ and $H_i(t)$ are the same on all elements of a given type (either blocking or storing), subscripts can be dropped, and the integral term then can be considered a constant $K'$ for all elements. Hence:

$$W_i = \frac{A_i l_i}{0.4\pi} K' \tag{17}$$

Since B and H have variations that are the same from element to element, the element dimensions $A_i$ and $l_i$ are assigned values for the various elements to be proportional to flux and magnetomotive force requirements. Thus:

$$\frac{\varphi_i}{B} = A_i \text{ and } 0.4\pi \frac{MMF_i}{H} = l_i \tag{18}$$

Substituting Equations 18 in Equation 17, $$W_i = K \varphi_i MMF_i$$

where $$K = \frac{K'}{BH}$$

The signal energy gain between two equivalent locations, e.g., store cores $a_i$ and $a_j$, in the register separated in signal receive time by $j-i$ phases is then:

$$\frac{W_j}{W_i} = \frac{\varphi_j MMF_j}{\varphi_i MMF_i} \tag{19}$$

For symmetrical operation the total energy gain per phase is a constant $\eta$. Expression 19 can then be written:

$$\eta^{j-i} = \frac{\varphi_j MMF_j}{\varphi_i MMF_i} \tag{20}$$

This expression can be seen to be equivalent to Equation 6 where $MMF_j = MMF_i$. Equation 5 relating flux linkages on elements directly connected within one coupling loop must still apply.

This proportioning of turns ratios, element cross sections, and path lengths can proceed under the restraint of Equations 20, 4, and 5 once a value of $\eta$ and a generating, or coupling, loop configuration have been decided upon by the designer.

The procedure, for example, can be performed as follows, considering again the four-phase register of FIG. 8A using generating loops as in FIG. 9B. The cores and primary network are first drawn out as shown in FIG. 12A and desired flux and MMF levels, in accordance with Equation 20, are assigned. Note that $\varphi$ and MMF levels in the blocking and storing cores are assigned using Equation 20. Blocking core levels are assigned independently of the levels in the storage cores except insofar as Equation 5 is concerned. Thus, let the levels in core $a_1$ be $\varphi_x$ and $MMF_x$ while in blocking core $b_1$ the levels are $\varphi_y$ and $MMF_y$. These are determined, as is known in the art, by the designer from a knowledge of switching and threshold properties of core types which are known to be suitable for particular types of applications. Equation 20 then serves to restrict the designer's choice of all remaining core variable levels in the register.

In the example of FIG. 12A the design object has been to utilize MMF gain alone on alternate phase positions, i.e., on phases 2, 4, et cetera, and on intermediate phases the phase-to-phase gain is achieved by circuit turns. In addition, at the intermediate phase positions the path length gain in the preceding phase position is transferred to flux level gain by circuit turns and MMF level drops back to correspond to the original path length. For the elements $a_2$ and $b_2$ of the second phase position, from Equation 20:

$$\varphi_{a2} = \varphi_{a1} = \varphi_x$$
$$\varphi_{b2} = \varphi_{b1} = \varphi_y$$
$$MMF_{a2} = \eta MMF_{a1} = \eta MMF_x$$
$$MMF_{b2} = \eta MMF_{b1} = \eta MMF_y$$

For phase position three, however:

$$\varphi_{a3} = \eta^2 \varphi_{a1} = \eta^2 \varphi_x$$
$$MMF_{a3} = MMF_{a1} = MMF_x$$
$$\varphi_{b3} = \eta^2 \varphi_{b1} = \eta^2 \varphi_y$$
$$MMF_{b3} = MMF_{b1} = MMF_y$$

and so on for phase positions 4, 5 . . . 8 as shown in FIG. 12A.

The proposed coupling loops are now figuratively placed on the cores with turns adjusted in each separate loop to satisfy Equations 4 and 5 with respect to the assigned flux levels. This is shown in FIG. 12B where $\eta^2$ represents the number of turns in terms of gain per phase.

Although the wires are drawn with single-turn linkages, the alphameric indications show the actual numbers of turns. The polarity of windings, of course, must agree with that shown as a single turn.

Figure 12B:
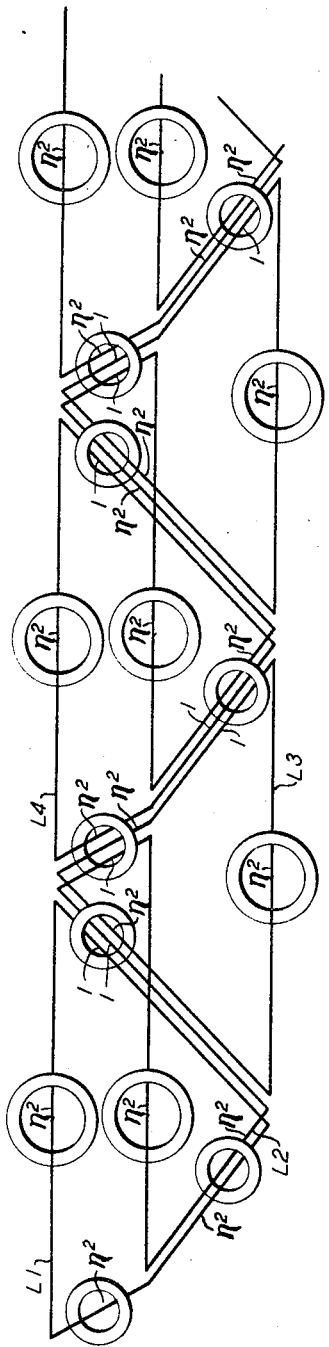

Around lopp L1 in FIG. 12B flux and turns levels are thus:

$$\varphi_{a1} = \varphi_x \qquad \eta = \eta^2 \qquad \psi = \eta^2 \varphi_x$$
$$\varphi_{b1} = \varphi_y (=\varphi_x) \qquad \eta = \eta^2 \qquad \psi = \eta^2 \varphi_x$$
$$\varphi_b{}^2 = \varphi_y (=\varphi_x) \qquad \eta = \eta^2 \qquad \psi = \eta^2 \varphi_x$$
$$\varphi_{b3} = \eta^2 \varphi_y (=\eta^2 \varphi_x) \qquad \eta = 1 \qquad \psi = \eta^2 \varphi_x$$

The equality of $\varphi_y$ and $\varphi_x$ is selected for manufacturing convenience and requires flux paths to have equal cross-sectional areas.

In loop L2:

$$\varphi_{a2} = \varphi_x \qquad \eta = \eta^2 \qquad \psi = \eta^2 \varphi_x$$
$$\varphi_{b2} = \varphi_x \qquad \eta = \eta^2 \qquad \psi = \eta^2 \varphi_x$$
$$\varphi_{b3} = \eta^2 \varphi_x \qquad \eta = 1 \qquad \psi = \eta^2 \varphi_x$$
$$\varphi_{b4} = \eta^2 \varphi_x \qquad \eta = 1 \qquad \psi = \eta^2 \varphi_x$$

Each loop is thus designed until a repeating pattern is established, i.e., odd numbered loops are the same as loop L1 and even numbered loops are the same as loop L2. Note that the only turns levels employed are $\eta^2$ and 1 so that no difficulty in applying integral values is experienced with this design.

Figure 12C:
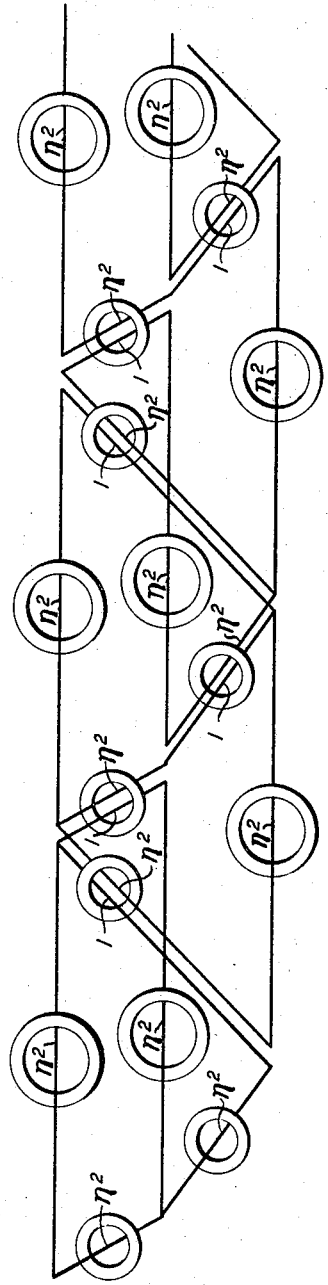

It may further be noted in FIG. 12B that in the blocking cores at least two windings appear with identical numbers of turns so that these may be combined in one winding as in the original direct coupled primary network. Thus, the equivalent coupling arrangement of FIG. 12C is obtained with winding turns as shown.

The foregoing has been intended to show some of the variations possible with one member of this family of circuits. Clearly the analytical techniques described can be further applied to fit the register to a variety of applications. Basically, however, the mode of operation, the sequence of element switching, and performance of all such equivalent circuits will be the same as described for the primary network.

Although this invention has been described in connection with particular arrangements and applications thereof, it is to be understood that these are merely for the purpose of illustrating the underlying inventive principles; and additional applications and embodiments which will be obvious to those skilled in the art are included within the spirit and scope of the invention.

What is claimed is:

1. An all-magnetic logic network comprising
   a magnetic storage device having set and reset stable states of magnetic remanence,
   electromagnetic coupling means having input and output portions, each portion being operatively coupled to the other and to said storage device in opposite senses, each of said portions having a set state and a reset state of magnetic remanence,
   means applying input signals to said input portion for switching such portion back and forth between its set and reset states for setting said storage device upon switching to the set state and for setting said output portion upon switching to the reset state to generate an output signal of a first polarity, and
   means applying a control signal to said network for simultaneously resetting said storage device and said output portion for generating an output signal of a second polarity.

2. The logic network of claim 1 in which
   said storage device is a toroidal magnetic core,
   said coupling means comprises further toroidal cores as said input and output portions, respectively, and an electric loop circuit linking said storage core in one sense and linking both of said input and output cores in a sense which is opposite to the sense of the linking in said storage core, and
   said control signal applying means is a circuit lead for conducting current through said storage and output cores in the same sense.

3. A shaft register comprising
   a plurality of sections each including a storing magnetic core and coupling cores, each of said cores having a substantially rectangular hysteresis characteristic defining two stable conditions of magnetic remanence, and a coupling loop circuit linking said storing core with two of said coupling cores, one being an input coupling core and one being an output coupling core, the output coupling core of each loop being also the input coupling core of the loop in the next succeeding section of the shift register,
   a source of shift signals including means successively applying shift pulses to said storing and output coupling cores of each section in succession for driving such cores to a first one of said two conditions, and
   means biasing to the second one of said stable conditions the storing core and input coupling core of the second section following a section which is receiving a shift signal.

4. An all-magnetic shift register comprising
   a plurality of magnetic storage devices having set and reset stable states of magnetic remanence,
   electromagnetic coupling means having input and output portions with set and reset states of stable magnetic remanence coupling said devices in a tandem sequence of shift register sections with one of said devices in each section, each input and output portion of each section being operatively coupled to the other in one sense and coupled to the storage device of the section in the opposite sense, the output portion of each section in said sequence being operatively coupled to the input portion of a following section for switching such portions in step to the same states,
   means applying input signals to said input portion of the first section of said sequence for switching such portion back and forth between its set and reset states for setting the section storage device upon switching to the set state and for setting the section output portion upon switching to the reset state, and
   means applying control signals in time controlled order to the sections in said sequence for, in each section, simultaneously resetting the storage device and the output portion of such section.

5. The shift register in accordance with claim 4 in which
   said input signal applying means are operative during times when no control signals are being applied to said first section.

6. The shift register in accordance with claim 4 in which
   said sections are arranged in said sequence in a plurality of groups of $m$ sections each, and
   said control signal applying means comprises $m$ electric circuits supplying control signals to said $m$ circuits within each group in different phases, respectively, a total time T being required for completing a cycle of said different phases, and the time during which each phase is supplied being $T/m$.

7. The shift circuit in accordance with claim 4 wherein
   means supply bias signals generating magnetomotive forces of proper polarity but insufficient magnitude to switch said devices to their set conditions.

8. The shift register circuit in accordance with claim 7 wherein
   said bias supplying means comprise a direct current circuit electromagnetically engaging all of said devices at the same time.

9. The shift register circuit in accordance with claim 7 wherein
   a plurality of said sections comprise a stage of said shift register circuit, and said bias supplying means comprise multiphase circuits applying bias signals wthin each register stage to storage devices not receiving said control signals and following in said sequence a device that is receiving said control signals.

10. The shift register in accordance with claim 4 in which
said control signal applying means comprises $m$ electric circuits with signals of different phases for successively applying control signals to the sections of each group of $m$ sections in said sequence.

11. The shift register in accordance with claim 10 in which
$m$ is equal to three, and
said coupling means are adapted so that the application of a control signal to reset the storage device in the first section in each of said groups of sections generates in said output portion of the section coupling means a signal which is coupled through said coupling means to set the storage device in the third section of said group without disturbing the storage device of the second section.

12. An all-magnetic shift register comprising
magnetic storing devices in a predetermined sequence having rectangular hysteresis characteristics defining first and second stable conditions of magnetic remanence,
means applying pulse control signals of $m$ signal phases to said devices in said predetermined sequence for successively shifting each device in said sequence to said first condition, and
all-magnetic means coupling said devices together for driving the $(m-1)^{th}$ device of said sequence following a shifting device to its second condition in response to the transfer of said shifting device from its second to its first condition.

13. The shift register in accordance with claim 12 wherein
$m$ is equal to three,
said devices are toroidal magnetic cores, and
said coupling means comprises loop circuits each linking a different one of said cores and further comprising coupling cores each of which is linked by two of said loop circuits so that loop current tending to drive the storage device of a loop to one of said stable conditions also tends to drive both of said coupling cores of the same loop circuit to the other of said stable conditions.

14. The shift register in accordance with claim 13 wherein
said storing and coupling cores have the same turns-area product $nA$ where $n$ is the number of turns of one of said loop circuits common to both a storing and a coupling core and $A$ is the magnetic cross-sectional area in a diametrical plane which is perpendicular to the plane of the core circumference, but wherein said storing cores have a much longer magnetic path length than said coupling cores.

15. The shift register in accordance with claim 13 wherein
said control signal applying means are adapted to drive the output coupling core of a loop circuit to said first stable condition at the same time that the storing core of the same loop is also driven to said first stable condition thereby preventing reverse propagation of signals through said register when a control signal is applied to cores of subsequent coupling loop circuits in said sequence.

16. The shift register in accordance with claim 13 wherein
said storing device cores all have a much larger required coercive magnetomotive force for switching between their stable remanence conditions than do said coupling cores.

17. The shift register in accordance with claim 12 wherein
said devices are similar branches of a plurality of multi-aperture magnetic members, each of said members including in addition first and second further branches each of which is connected between the ends of said storing branch and has a much shorter magnetic path length than said storing branch, each of said further branches also having a magnetic path cross-sectional area equal to approximately one-half of the cross-sectional area of said storing branch, and
said coupling means comprising said further branches and electric loop circuits coupling said second branch of each of said members to said first branch of the next one of said members in said sequence.

18. The shift register in accordance wtih claim 12 wherein
$m$ is greater than three,
said first and second conditions represent coded information and the shifting of one device in response to the shifting of another device results in the transfer of information therebetween by said coupling means in the form of induced transfer current resulting from the shifting of the last-mentioned device,
said coupling means comprises information transfer loop circuit means linking $m$ of said devices so that at least a part of said information transfer current is coupled between the first and the $m^{th}$ ones of said $m$ devices in said sequence, and said loop circuit means includes plural return branch paths whereby each of said $m$ devices other than said first and $m^{th}$ ones thereof is subjected to only $$\frac{1}{m-2}$$

of said transfer current.

19. The shift register in accordance with claim 18 wherein
said loop circuit means comprises a series loop circuit linking said first and $m^{th}$ devices and having parallel-connected branches linking each of the remaining ones of said $m$ devices other than said first and $m^{th}$ devices.

20. The shift register in accordance with claim 19 wherein
a plurality of said series loop circuits are included in said loop circuit means, each such loop circuit after the first being precessed by one storing device position in said sequence.

21. The shift register in accordance with claim 18 wherein said loop circuit means comprises
a plurality of series loop circuits each coupled to at least one of said devices of said sequence and all of said series loop circuits being congruent in form through said sequence, and
mutual coupling means in each of said series loop circuits coupling such circuit to following and preceding series loop circuits in said sequence.

22. The shift register in accordance with claim 21 wherein
said register has a predetermined gain per phase, and each of said series loop circuits links the devices and the coupling means with which it is associated with a predetermined pattern of numbers of circuit turns, which pattern is a function of said gain per phase and is the same for each of said loop circuits.

23. The shift register in accordance with claim 18 wherein
said loop circuit means cooperates with said devices to constitute $m-1$ series transmission paths for information signals through said register, one of said paths including the first and $m^{th}$ devices of a group of *m* devices and each of the other *m*–2 of said *m*–1 paths including a different one of the remaining ones of said *m* devices.

24. The shift register in accordance with claim 18 wherein
said register has a predetermined gain $\eta$ per phase position,
said loop circuit means includes *m* phase positions,
at least one of said *m* devices coupled to said loop circuit means has different magnetomotive force requirements from those of another of said *m* devices for achieving said gain $\eta$.

25. The shift register in accordance with claim 24 wherein
said loop circuit means includes plural loop circuits each linking a predetermined number of said *m* devices,
mutual coupling means couple said loop circuits together, and
said loop circuits link their respective mutual coupling means and said *m* devices in a first pattern of circuit turns for said devices and a second pattern of circuit turns for said mutual coupling means, both said first and second patterns being functions of said gain $\eta$.

26. The shift register in accordance with claim 25 wherein
said loop circuit means is a stage of said register and said register includes a plurality of tandem stages, and
only two different levels of numbers of turns are employed in said first and second patterns together.

27. A magnetic core shift register comprising
an electric circuit for information transfer, said circuit including a cascade of inductively coupled circuit loops, said information circuit containing only magnetic circuit elements in addition to connecting wires, and a plurality of coupling magnetic cores each linked by two adjacent circuit loops in said cascade to provide said inductive coupling,
a plurality of storing cores each linked by only one of said circuit loops, three successive storing cores and three of their associated coupling cores defining one bit position in said register, all of said cores having substantially rectangular hysteresis characteristics defining two conditions of stable magnetic remanece,
said storing cores being linked by their loop circuits so that the switching of a storing core in one of said loops from one of its stable states to the other induces a current in the second succeeding loop for switching the storing core thereof to said one stable state,
three drive signal circuits of different phase, each of said drive circuits linking in one bit position of the register a storing core and one of the coupling cores of a loop, the drive signals being of proper polarity and magnitude to drive said cores to said other condition, and
bias means tending to bias said cores to said one condition.

28. An all-magnetic shift register comprising
a purality of loop circiuts coupled in a predetermined tandem sequence,
a different storing magnetic member electromagnetically linked to each of said loop circuits, the members linked to alternate ones of said loop circuits in said sequence being so linked with opposite sense from the linkage of intermediate members to their respective loops, and
means applying pulses in a time sequence to said members in said sequence for transferring information through said register from the storing member of one of said circuits to the storing member of the second succeeding loop circuit in the sequence of the tandem coupling without altering the information content of the intervening one of said members in said sequence.

29. The shift register in accordance with claim 28 wherein
said storing members are toroidal magnetic cores linked by said loop circuits and having substantially rectangular hysteresis characteristics defining two stable conditions of magnetic remanence.

30. An all-magnetic shift register comprising
a plurality of magnetic devices each having first and second stables operating conditions and the volume of magnetic material in each device being known,
means coupling said devices in a predetermined sequence in said register for shifting an information signal condition through said register from a transmitting portion of said devices to a receiving portion of said devices,
means actuating predetermined devices in said transmitting portion from said first to said second stable condition thereby generating a signal transfer current in said coupling means,
said current actuating predetermined devices in said receiving portion toward said first stable condition and returning to said transmitting portion via at least one additional one of said devices between said transmitting and receiving portions in said sequence, and
the volume of magnetic material in said receiving portion devices bearing to the volume of magnetic material in said intermediate devices a ratio less than unity.

References Cited
UNITED STATES PATENTS

| | | |
|---|---|---|
| 2,924,665 | 2/1960 | Malthaner. |
| 3,192,511 | 6/1965 | Dick. |
| 3,267,444 | 8/1966 | Richard. |

STANLEY M. URYNOWICZ, JR., *Primary Examiner.*